(12) United States Patent
Kidney et al.

(10) Patent No.: US 10,266,014 B2
(45) Date of Patent: Apr. 23, 2019

(54) TIRE HAVING CIRCUMFERENTIALLY BIASED SIPE DEPTHS

(71) Applicant: Bridgestone Americas Tire Operations, LLC, Nashville, TN (US)

(72) Inventors: Jacob R. Kidney, Wadsworth, OH (US); John L. Turner, Tucson, AZ (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 15/102,632

(22) PCT Filed: Dec. 10, 2014

(86) PCT No.: PCT/US2014/069427
§ 371 (c)(1),
(2) Date: Jun. 8, 2016

(87) PCT Pub. No.: WO2015/094830
PCT Pub. Date: Jun. 25, 2015

(65) Prior Publication Data
US 2016/0318351 A1    Nov. 3, 2016

Related U.S. Application Data

(60) Provisional application No. 61/918,113, filed on Dec. 19, 2013.

(51) Int. Cl.
*B29D 30/06*     (2006.01)
*B60C 11/12*     (2006.01)
*B60C 11/11*     (2006.01)

(52) U.S. Cl.
CPC .......... *B60C 11/1259* (2013.01); *B60C 11/11* (2013.01); *B60C 11/1263* (2013.01);
(Continued)

(58) Field of Classification Search
CPC ........ B29D 2030/0613; B60C 11/1259; B60C 2011/1268
See application file for complete search history.

(56) References Cited

U.S. PATENT DOCUMENTS

| | | |
|---|---|---|
| 4,934,424 A | 6/1990 | Kojima |
| 5,944,082 A | 8/1999 | Thompson et al. |

(Continued)

FOREIGN PATENT DOCUMENTS

| | | |
|---|---|---|
| AU | 2007254657 | 1/2008 |
| CN | 1576065 | 2/2005 |

(Continued)

OTHER PUBLICATIONS

Machine translation for Japan 2012-250590 (no date).*

(Continued)

*Primary Examiner* — Steven D Maki
(74) *Attorney, Agent, or Firm* — Shaun J. Fox; Bryan Jaketic

(57) ABSTRACT

A tire includes a tread having a first plurality of tread blocks on a first side of an equatorial plane and a second plurality of tread blocks on the second side. Each of the first plurality of tread blocks has a first leading lug wall, a first trailing lug wall, a first leading sipe proximate to the first leading lug wall, and a first trailing sipe proximate to the first trailing lug wall. Each of the second plurality of tread blocks has a second leading lug wall, a second trailing lug wall, a second leading sipe proximate to the second leading lug wall, and a second trailing sipe proximate to the second trailing lug wall. The first leading sipes have a depth greater that of the first trailing sipes. The second leading sipes have a depth less than that of the second trailing sipes.

18 Claims, 7 Drawing Sheets

(52) U.S. Cl.
CPC .. *B60C 11/1272* (2013.01); *B29D 2030/0613* (2013.01); *B60C 2011/1209* (2013.01); *B60C 2011/1268* (2013.01)

(56) References Cited

U.S. PATENT DOCUMENTS

| | | | |
|---|---|---|---|
| 6,230,112 B1 | 5/2001 | Ishiyama | |
| 6,840,296 B2 | 1/2005 | Suzuki et al. | |
| 7,090,735 B2 | 8/2006 | Neugebauer et al. | |
| 7,836,926 B2 | 11/2010 | Suzuki | |
| 2001/0002602 A1 | 6/2001 | Nakamura | |
| 2002/0112800 A1* | 8/2002 | Suzuki | B60C 11/11 152/209.3 |
| 2003/0029535 A1* | 2/2003 | Neugebauer | B60C 11/11 152/110 |
| 2003/0029537 A1 | 2/2003 | Iwamura | |
| 2009/0281773 A1 | 11/2009 | Coe et al. | |
| 2011/0162770 A1 | 7/2011 | Yamakawa | |
| 2012/0067477 A1 | 3/2012 | Berzins et al. | |

FOREIGN PATENT DOCUMENTS

| | | | |
|---|---|---|---|
| EP | 0761479 | | 12/1997 |
| JP | 02-182502 A | * | 7/1990 |
| JP | 02241804 | | 9/1990 |
| JP | 2006051891 | | 2/2006 |
| JP | 2006-137314 A | * | 6/2006 |
| JP | 2008007047 | | 1/2008 |
| JP | 2012-250590 A | * | 12/2012 |

OTHER PUBLICATIONS

Machine translation for Japan 2006-137314 (no date).*
Machine translation for Japan 02-182502 (no date).*
Machine translation for Japan 02-241804 (Year: 2018).*
International Preliminary Report on Patentability; Corresponding PCT Application No. PCT/US2014/069427 filed Dec. 10, 2014; Jun. 21, 2016.
International Search Report; Corresponding PCT Application No. PCT/US2014/069427 filed Dec. 10, 2014; Authorized Officer Joong Sub Han; Mar. 19, 2015.
Written Opinion; Corresponding PCT Application No. PCT/US2014/069427 filed Dec. 10, 2014; Authorized Officer Joong Sub Han; Mar. 19, 2015.
Supplemental Search Report; Corresponding EP Application No. 14872174 filed Dec. 10, 2014, dated Jul. 4, 2017.
Search Opinion; Corresponding EP Application No. 14872174 filed Dec. 10, 2014; dated Jul. 4, 2017.

* cited by examiner

TIRE HAVING CIRCUMFERENTIALLY BIASED SIPE DEPTHS

FIELD OF INVENTION

The present disclosure relates to a tire having a circumferential tread with a plurality of tread blocks or other tread elements, with a plurality of sipes disposed therein. More particularly, the present disclosure relates to a tire having a circumferential tread with a plurality of tread blocks or other tread elements, with a plurality of sipes of varying depth disposed therein in a manner affecting the residual aligning torque (RAT) of the tire.

BACKGROUND

Tires, such as those used for passenger and light trucks, have a tread pattern which extends circumferentially about the tire. The tread may consist of a plurality of circumferential grooves and laterally extending slots which divide the tread into generally circumferentially extending ribs formed by a plurality of either continuous or discontinuous tread blocks. Many of the tread blocks are formed by slots, further divided by sipes. These sipes are formed by thin metal strips placed in the mold, referred to as sipe blades. These sipes provide various traction and stiffness characteristics to the tread blocks which also provide certain ride and handling characteristics for the vehicle. Even when the ribs of a tire are spaced symmetrically with respect to an equatorial plane of the tire, they can produce a moment on the tread at the contact patch with the roadway, causing a twisting force on the tire. This moment provides a tendency for a rolling tire to corner left or right and the vehicle to drift left or right when the steering wheel is released. This moment or torque at the contact patch is referred to as residual aligning torque (RAT). This global torque acting on the footprint is caused by the distribution of local shear forces generated at the contact surface of each tread lug. Control of these tire properties has merit for countering vehicle drift-pull due to road crown or other vehicle steering characteristics.

SUMMARY OF THE INVENTION

In one embodiment, a method of manufacturing a tire includes providing a circumferentially extending tread pattern of a tire with at least a first rib on a first side of an equatorial plane and a second rib on a second side of the equatorial plane. The first rib includes a first plurality of tread blocks. Each of the first plurality of tread blocks has a first leading lug wall, a first trailing lug wall, and a first plurality of sipes including a first leading sipe proximate to the first leading lug wall and a first trailing sipe proximate to the first trailing lug wall. The second rib includes a second plurality of tread blocks. Each of the second plurality of tread blocks has a second leading lug wall, a second trailing lug wall, and a second plurality of sipes including a second leading sipe proximate to the second leading lug wall and a second trailing sipe proximate to the second trailing lug wall. The method further includes varying a depth of each of the first plurality of sipes and each of the second plurality of sipes to change a residual aligning torque of the tire until a desired residual aligning torque is achieved. Each of the first leading sipes has a depth greater than a depth of each of the first trailing sipes, and each of the second leading sipes has a depth less than a depth of each of the second trailing sipes. The method also includes forming a tire having the circumferentially extending tread pattern.

In another embodiment, a tire has an equatorial plane defining a first side and a second side. The tire further includes a first set of tread elements on the first side of the tire. The first set of tread elements include a first tread element having a front half and a rear half. The first tread element includes a first plurality of sipes, including one or more first front sipes disposed in the front half of the first tread element and one or more first rear sipes disposed in the rear half of the first tread element. Each of the one or more first front sipes has a depth greater than each of the one or more first rear sipes. The tire also includes a second set of tread elements on the second side of the tire. The second set of tread elements includes a second tread element having a front half and a rear half. The second tread element includes a second plurality of sipes, including one or more second front sipes disposed in the front half of the second tread element and one or more second rear sipes disposed in the rear half of the second tread element. Each of the one or more second rear sipes has a depth greater than each of the one or more second front sipes.

In yet another embodiment, a tire includes a circumferential tread pattern having at least a first plurality of tread blocks on a first side of an equatorial plane and a second plurality of tread blocks on a second side of the equatorial plane. Each of the first plurality of tread blocks has a first leading lug wall, a first trailing lug wall, and a first plurality of sipes including a first leading sipe proximate to the first leading lug wall and a first trailing sipe proximate to the first trailing lug wall. Each of the second plurality of tread blocks has a second leading lug wall, a second trailing lug wall, and a second plurality of sipes including a second leading sipe proximate to the second leading lug wall and a second trailing sipe proximate to the second trailing lug wall. Each of the first leading sipes has a depth greater than a depth of each of the first trailing sipes, and each of the second leading sipes has a depth less than a depth of each of the second trailing sipes.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Rib" or "ribs" define the circumferential extending strip or strips of rubber on the tread that is defined by at least one circumferential groove and either a second wide groove or a lateral edge of the tread.

"Tread" refers to that portion of the tire that comes into contact with the road under normal inflation and load.

Directions are stated herein with reference to the axis of rotation of the tire. The terms "upward" and "upwardly" refer to a general direction towards the contacting surface of the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread surface than the "lower" or "bottom" element. Additionally, when relative directional terms such as "above" or "below" are used in connection with an element, an element that is "above" another element is closer to the tread surface than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
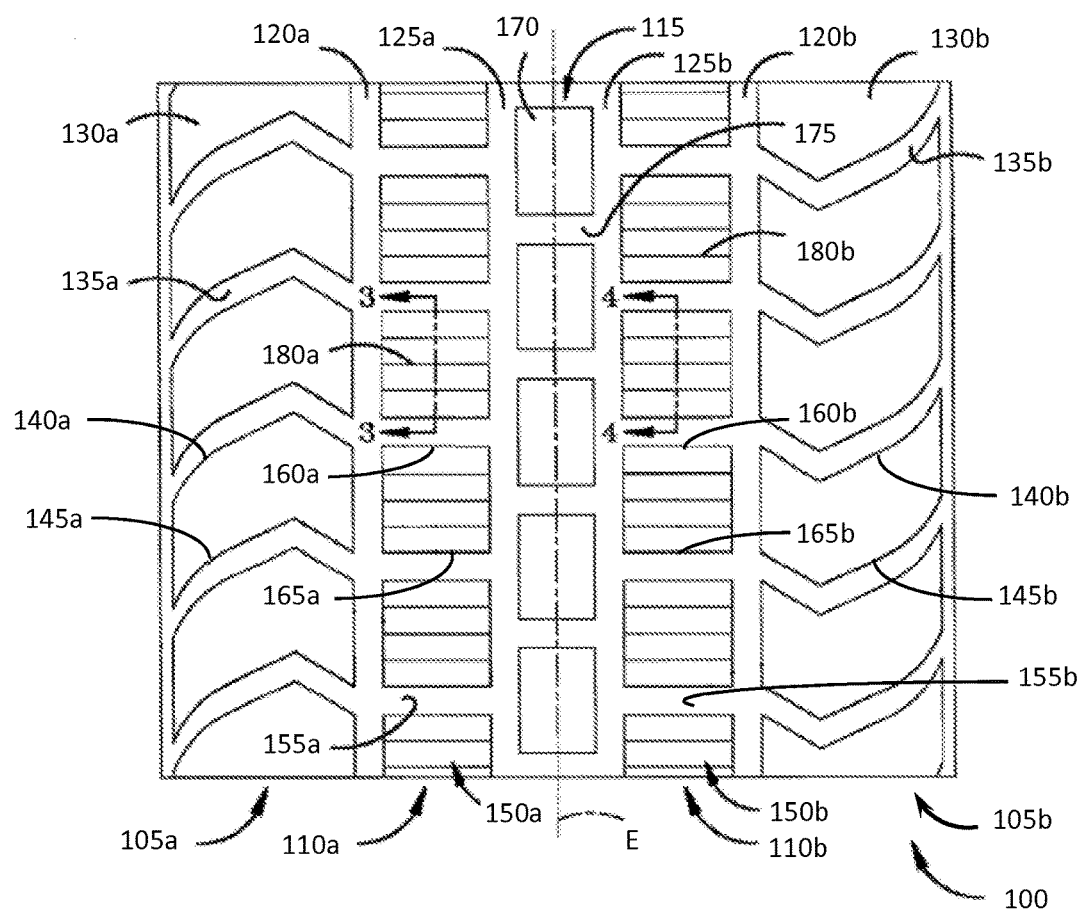
FIG. 1 is a diagrammatic plan view of one embodiment of a tire tread 100.

FIG. 1 illustrates a plan view of a portion of a tread pattern 100 for a tire having an equatorial plane E. In the illustrated embodiment, the tread pattern includes a pair of shoulder ribs 105a,b, a pair of intermediate ribs 110a,b and a center rib 115. A pair of outer circumferential grooves 120a,b separate the shoulder ribs 105a,b from the intermediate ribs 110a,b. Additionally, a pair of inner circumferential grooves 125a,b separate the intermediate ribs 110a,b from the center rib 115. While five ribs are shown in the illustrated embodiment, in alternative embodiments, any tire tread having two or more ribs may be employed. While straight grooves are shown in the illustrated embodiment, in alternative embodiments, zigzag, curved, or other shaped grooves may be employed. In another alternative embodiment, a plurality of tread blocks or tread elements may be employed instead of distinct ribs and grooves.

In the illustrated embodiment, the first and second shoulder ribs 105a,b are equidistant from the equatorial plane E. Likewise, the first and second intermediate ribs 110a,b are equidistant from the equatorial plane E. In alternative embodiments (not shown), the opposing ribs may be at different distances from the equatorial plane. In the most general case, ribs can be defined by the circumferential tread rubber strips contained between designated pairs of planes parallel to the equatorial plane. By this definition, any tread pattern can be segregated into a collection of circumferential ribs for purposes of practice of this invention.

The first shoulder rib 105a is formed by a first plurality of shoulder tread blocks 130a separated by first shoulder lateral grooves 135a. Each of the first plurality of shoulder tread blocks 130a has a first shoulder leading lug wall 140a and a first shoulder trailing lug wall 145a. Likewise, the second shoulder rib 105b is formed by a second plurality of shoulder tread blocks 130b separated by second shoulder lateral grooves 135b. Each of the second plurality of shoulder tread blocks 130b has a second shoulder leading lug wall 140b and a second shoulder trailing lug wall 145b. In the illustrated embodiment, the shoulder tread blocks 130 are generally chevron-shaped and the shoulder lateral grooves 135 are generally V-shaped. However, it should be understood that this is merely for illustrative purposes and the shoulder lateral grooves could be straight, curved, or have multiple angles to define shoulder tread blocks of any geometric shape.

The first intermediate rib 110a is formed by a first plurality of intermediate tread blocks 150a separated by first intermediate lateral grooves 155a. Each of the first plurality of intermediate tread blocks 150a has a first intermediate leading lug wall 160a and a first intermediate trailing lug wall 165a. Likewise, the second intermediate rib 110b is formed by a second plurality of intermediate tread blocks 150b separated by second intermediate lateral grooves 155b. Each of the second plurality of intermediate tread blocks 150b has a second intermediate leading lug wall 160b and a second intermediate trailing lug wall 165b. In the illustrated embodiment, the intermediate tread blocks 150 are generally square-shaped and the intermediate lateral grooves 155 are generally straight. However, it should be understood that this is merely for illustrative purposes and the intermediate lateral grooves could be curved or have multiple angles to define intermediate tread blocks of any geometric shape.

Center rib 115 is formed by a plurality of circumferentially spaced central tread blocks 170 separated by central lateral grooves 175. In the illustrated embodiment, the central tread blocks 170 are generally rectangular and the central lateral grooves 175 are generally straight. However, it should be understood that this is merely for illustrative purposes and the central lateral grooves could be curved or have multiple angles to define central tread blocks of any geometric shape.

In the illustrated embodiment, each of the first plurality of intermediate tread blocks 150a includes a first plurality of sipes 180a, and each of the second plurality of intermediate tread blocks includes a second plurality of sipes 180b. Each of the first and second plurality of sipes 180a,b is a straight sipe when viewed from above, and extends across the entire tread blocking a lateral direction. In an alternative embodiment (not shown), the sipes may be angled, curved, or include multiple segments at different angles when viewed from above. In another alternative embodiment (not shown), the sipes may extend across only a portion of the tread block.

While three sipes are shown in each of the intermediate tread blocks 150a,b, it should be understood that any number of sipes may be employed. Additionally, the number of sipes may vary from block to block. Further, sipes may be employed on the plurality of central tread blocks or on the plurality of shoulder blocks instead of, or in addition to, the sipes on the intermediate blocks.

Figure 2:
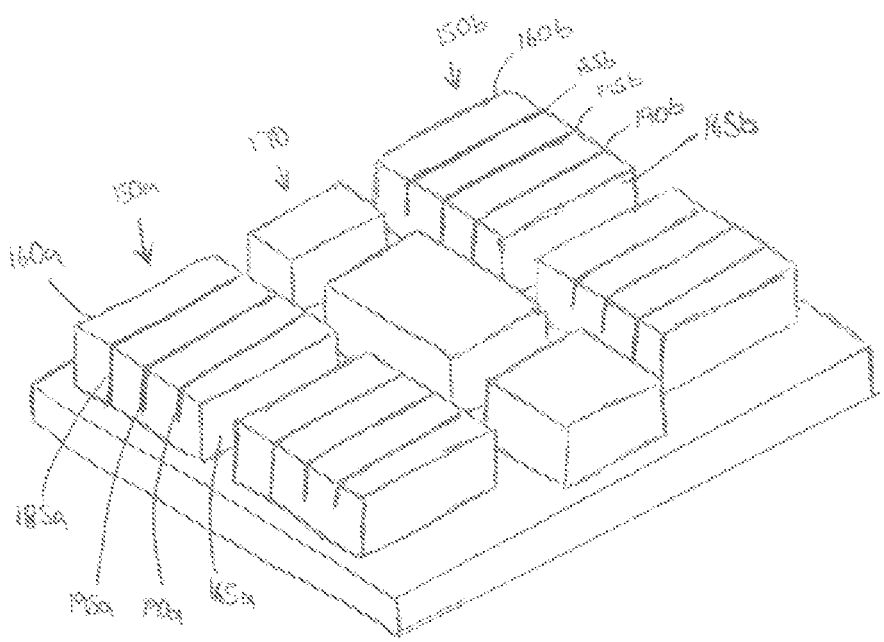
FIG. 2 is an enlarged diagrammatic perspective view of a portion of the tire tread 100.
Figure 3:
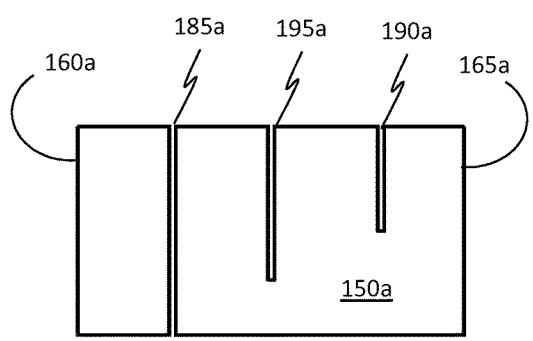
FIG. 3 is a cross section of one embodiment of a tread element on a first side of a tire, taken on line 3-3 of FIG. 1.
Figure 4:
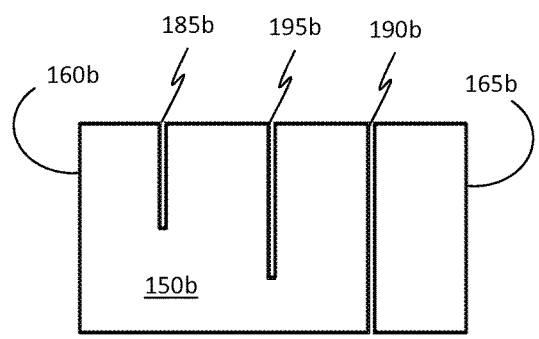
FIG. 4 is a cross section of one embodiment of a tread element on a first side of a tire, taken on line 4-4 of FIG. 1.

In the illustrated embodiment, the depth of the sipes varies, as can be best seen in FIGS. 2-4. FIG. 2 is an enlarged diagrammatic perspective view of a portion of the tire tread 100. FIG. 3 is a cross section of one of the first intermediate tread blocks 150a, taken on line 3-3 of FIG. 1. FIG. 4 is a cross section of one of the second intermediate tread blocks 150b, taken on line 4-4 of FIG. 1.

With reference to FIGS. 2 and 3, each of the first plurality of intermediate tread blocks 150a includes a first leading sipe 185a proximate to the first leading lug wall 160a, a first trailing sipe 190a proximate to the first trailing lug wall 165a, and a first intermediate sipe 195a disposed between the first leading sipe 185a and the first trailing sipe 190a. The first leading sipe 185a has a depth greater than that of both the first intermediate sipe 195a and the first trailing sipe 190a. The first intermediate sipe 195a has a depth greater than that of the first trailing sipe 190a. In one embodiment, the first leading sipe is twice as deep as the first trailing sipe. However, any range of depths may be employed.

With reference to FIGS. 2 and 4, each of the second plurality of intermediate tread blocks 150b includes a second leading sipe 185b proximate to the second leading lug wall 160b, a second trailing sipe 190b proximate to the second trailing lug wall 165b, and a second intermediate sipe 195b disposed between the second leading sipe 185b and the second trailing sipe 190b. The first trailing sipe 190b has a depth greater than that of both the second intermediate sipe 195b and the second leading sipe 185b. The second intermediate sipe 195b has a depth greater than that of the second leading sipe 190b. In one embodiment, the second trailing sipe is twice as deep as the second leading sipe. However, any range of depths may be employed.

The depths of the sipes 180a,b in the first and second intermediate tread blocks 150a,b vary in opposite directions. The depth of each sipe may be selected to achieve a desired RAT. In one embodiment, the sipes 180a,b will be formed with a width in a range between 0.015 and 0.06 inches. In one particular embodiment, the width is approximately 0.03 inches. The depth of the sipes 180a,b will be within the range of 20% and 100% of the height of the intermediate tread blocks 150a,b.

In one embodiment, each of the first leading sipes 185a has a depth substantially equal to a depth of each of the second trailing sipes 190b. Likewise, each of the first trailing sipes 190a has a depth substantially equal to a depth of each of the second leading sipes 185b. However, it should be understood that any variation of sipe depth may be employed.

While FIGS. 1-4 show each of the first plurality of intermediate tread blocks 150a having the same sipe formation, it should be understood that one or more of the first plurality of intermediate tread blocks 150a may have different sipe formations. Indeed, any number of sipe formations may be employed on the first plurality of intermediate tread blocks to achieve a desired RAT. The number of sipes in each of the first plurality of tread blocks may vary, as may the placement and depth of the sipes. In the most extreme example, each of the first plurality of tread blocks may have a unique sipe formation.

Likewise, while FIGS. 1-4 show each of the second plurality of intermediate tread blocks 150b having the same sipe formation, it should be understood that one or more of the second plurality of intermediate tread blocks 150b may have different sipe formations. Again, any number of sipe formations may be employed on the second plurality of intermediate tread blocks to achieve a desired RAT. The number of sipes in each of the second plurality of tread blocks may vary, as may the placement and depth of the sipes. In the most extreme example, each of the second plurality of tread blocks may have a unique sipe formation.

While the left side of the tire is designated as the first side of the tire and the right side of the tire is designated as the second side in FIGS. 1 and 2, the invention is not so limited. Tread elements on a right side of a tire may have deeper sipes near the leading lug wall while tread elements on the left side of the tire have deeper sipes near the trailing lug wall.

The tread pattern 100 shown in FIGS. 1-4 is an exemplary tread pattern that may be used in a method of manufacturing a tire. In such a method, a designer may wish to design a tire having a specified RAT. The designer is provided with a circumferentially extending tread pattern of a tire, such as the tread pattern 100, with at least a first rib on a first side of an equatorial plane and a second rib on a second side of an equatorial plane. Using FIG. 1 as a non-limiting example, the first intermediate rib 110a is the first rib and the second intermediate rib 110b is the second rib.

The designer then varies a depth of each of the first plurality of sipes 180a and each of the second plurality of sipes 180b to change a RAT of the tire until a desired residual aligning torque is achieved. The designer may then form one or more tires having the designed tread pattern.

While FIGS. 1-4 show one example of sipe formations, it should be understood that any number of sipe formations may be employed to achieve a desired RAT. FIGS. 5-14 illustrate additional examples of tread blocks having sipes of varying depth. While FIG. 1 shows intermediate tread blocks having sipes and shoulder blocks without sipes, it should be understood that any blocks of the tire may have sipes of varying depths.

Figure 5:
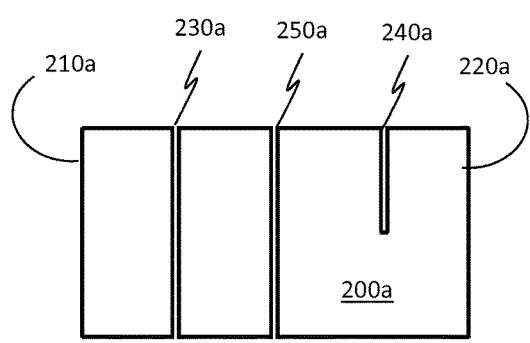
FIG. 5 is a cross section of an alternative embodiment of a tread element on a first side of a tire.
Figure 6:
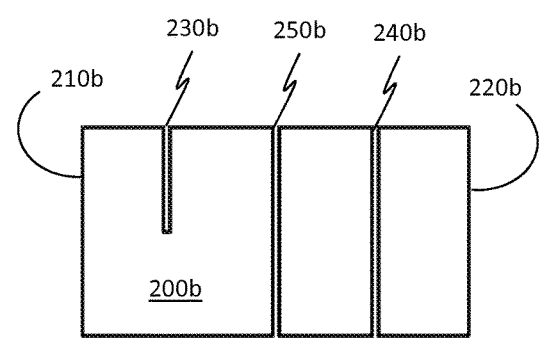
FIG. 6 is a cross section of an alternative embodiment of a tread element on a second side of a tire.

FIGS. 5 and 6 illustrate cross sections of an alternative embodiment of first and second tread elements 200a,b on a first and second side of a tire, respectively. In this embodiment, first tread element 200a includes a first leading lug wall 210a and a first trailing lug wall 220a. A first leading sipe 230a is proximate to the first leading lug wall 210a, a first trailing sipe 240a is proximate to the first trailing lug wall 220a, and a first intermediate sipe 250a is disposed between the first leading sipe 230a and the first trailing sipe 240a. The first leading sipe 230a has a depth equal to a depth of the first intermediate sipe 250a. Both the first leading sipe 230a and the first intermediate sipe 250a have a depth greater than that of the first trailing sipe 240a. In one embodiment, the depth of the first leading sipe 230a and the first intermediate sipe 250a is twice as great as the depth of the first trailing sipe 240a. However, any range of depths may be employed.

Additionally, in this embodiment second tread element 200b includes a second leading lug wall 210b and a second trailing lug wall 220b. A second leading sipe 230b is proximate to the second leading lug wall 210b, a second trailing sipe 240b is proximate to the second trailing lug wall 220b, and a second intermediate sipe 250b is disposed between the second leading sipe 230b and the second trailing sipe 240b. The first trailing sipe 240b has a depth equal to a depth of the second intermediate sipe 250b. Both the second trailing sipe 240b and the second intermediate sipe 250b have a depth greater than that of the second leading sipe 230b. In one embodiment, the depth of the second trailing sipe 240b and the second intermediate sipe 250b is twice as great as the depth of the second leading sipe 230b. However, any range of depths may be employed.

Figure 7:
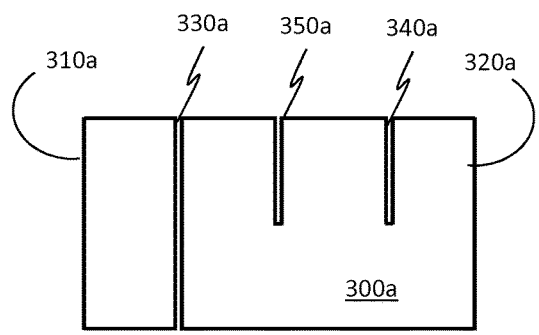
FIG. 7 is a cross section of another alternative embodiment of a tread element on a first side of a tire.
Figure 8:
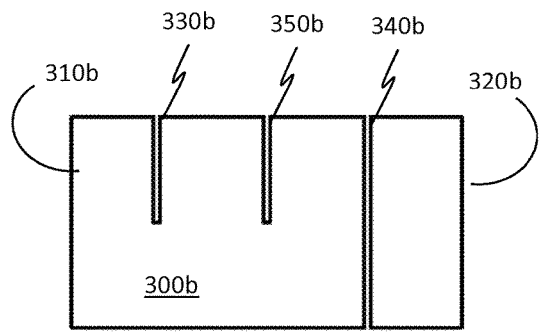
FIG. 8 is a cross section of another alternative embodiment of a tread element on a second side of a tire.

FIGS. 7 and 8 illustrate cross sections of another alternative embodiment of first and second tread elements 300a,b on a first and second side of a tire, respectively. In this embodiment, first tread element 300a includes a first leading lug wall 310a and a first trailing lug wall 320a. A first leading sipe 330a is proximate to the first leading lug wall 310a, a first trailing sipe 340a is proximate to the first trailing lug wall 320a, and a first intermediate sipe 350a is disposed between the first leading sipe 330a and the first trailing sipe 340a. The first trailing sipe 340a has a depth equal to a depth of the first intermediate sipe 350a. The first leading sipe 330a has a depth that is greater than both the first trailing sipe 340a and the first intermediate sipe 350a. In one embodiment, the depth of the first leading sipe 330a is twice as great as the depth of the first trailing sipe 340a and the first intermediate sipe 350a. However, any range of depths may be employed.

Additionally, in this embodiment second tread element 300b includes a second leading lug wall 310b and a second trailing lug wall 320b. A second leading sipe 330b is proximate to the second leading lug wall 310b, a second trailing sipe 340b is proximate to the second trailing lug wall 320b, and a second intermediate sipe 350b is disposed between the second leading sipe 330b and the second trailing sipe 340b. The first leading sipe 340b has a depth equal to a depth of the second intermediate sipe 350b. The second trailing sipe 340b has a depth greater than that of both the second leading sipe 330b and the second intermediate sipe 350b. In one embodiment, the depth of the second trailing sipe 340b is twice as great as the depth of the second leading sipe 330b and the second intermediate sipe 350b. However, any range of depths may be employed.

Figure 9:
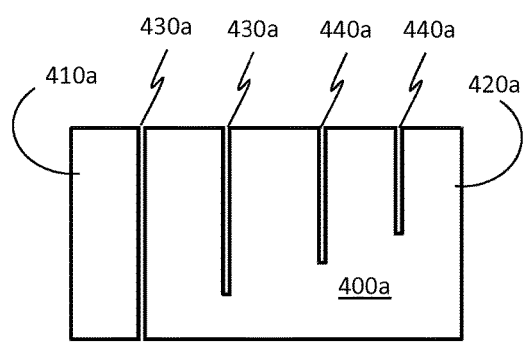
FIG. 9 is a cross section of still another alternative embodiment of a tread element on a first side of a tire.
Figure 10:
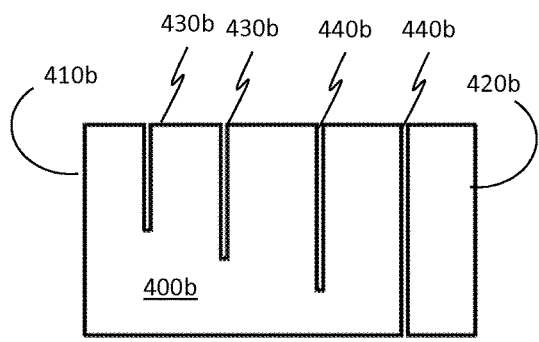
FIG. 10 is a cross section of still another alternative embodiment of a tread element on a second side of a tire.

FIGS. 9 and 10 illustrate cross sections of yet another alternative embodiment of first and second tread elements 400a,b on a first and second side of a tire, respectively. In this embodiment, the first tread element 400a has a first leading lug wall 410a and a first trailing lug wall 420a. The first tread element 400a also includes a pair of first front sipes 430a disposed at different distances from the first leading lug wall 410a. The first tread element 400a further includes a pair of first rear sipes 440a disposed at different distances from the first trailing lug wall 420a. In this embodiment, each of the sipes has a different depth, with the depth increasing towards the first leading lug wall 410a.

Likewise, the second tread element 400b has a second leading lug wall 410b and a second trailing lug wall 420b. The second tread element 400b also includes a pair of second front sipes 430b disposed at different distances from the second leading lug wall 410b. The second tread element 400b further includes a pair of second rear sipes 440b disposed at different distances from the second trailing lug wall 420b. In this embodiment, each of the sipes has a different depth, with the depth increasing towards the second trailing lug wall 420b.

Figure 11:
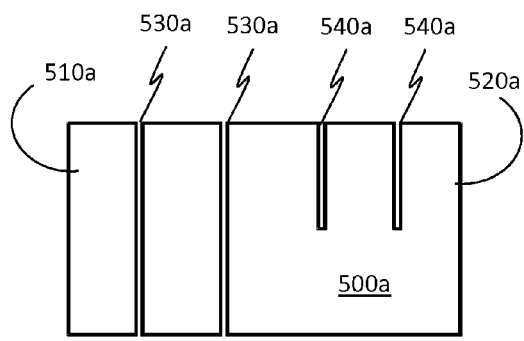
FIG. 11 is a cross section of yet another alternative embodiment of a tread element on a first side of a tire.
Figure 12:
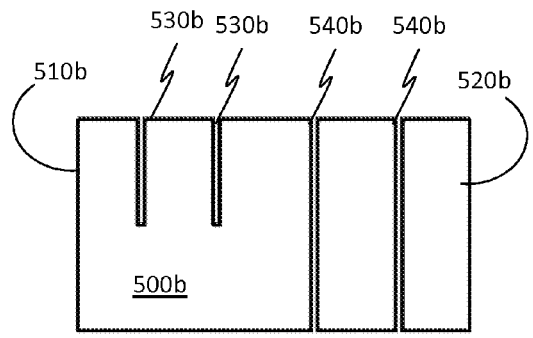
FIG. 12 is a cross section of yet another alternative embodiment of a tread element on a second side of a tire.

FIGS. 11 and 12 illustrate cross sections of still another alternative embodiment of first and second tread elements 500a,b on a first and second side of a tire, respectively. In this embodiment, the first tread element 500a has a first leading lug wall 510a and a first trailing lug wall 520a. The first tread element 500a also includes a pair of first front sipes 530a disposed at different distances from the first leading lug wall 510a. The first tread element 500a further includes a pair of first rear sipes 540a disposed at different distances from the first trailing lug wall 520a. In this embodiment, each of the pair of first front sipes 530a have substantially the same first depth, and each of the plurality of first rear sipes 540a have substantially the same second depth, wherein the first depth is greater than the second depth.

Likewise, the second tread element 500b has a second leading lug wall 510b and a second trailing lug wall 520b. The second tread element 500b also includes a pair of second front sipes 530b disposed at different distances from the second leading lug wall 510b. The second tread element 500b further includes a pair of second rear sipes 540b disposed at different distances from the second trailing lug wall 520b. In this embodiment, each of the plurality of second front sipes 530b have substantially the same third depth, and each of the plurality of second rear sipes 540b have substantially the same fourth depth, wherein the fourth depth is greater than the third depth.

In this illustrated embodiment, the first depth is substantially equal to the fourth depth and the second depth is substantially equal to the third depth. However, it should be understood that in alternative embodiments, these depths need not be equal.

Figure 13:
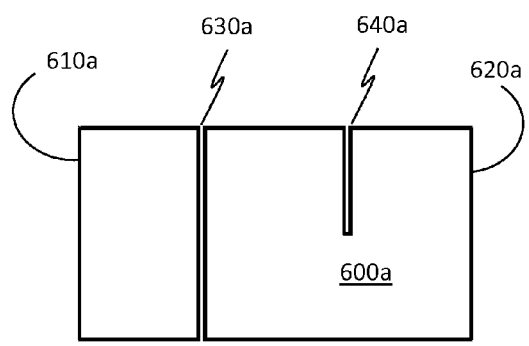
FIG. 13 is a cross section of still another alternative embodiment of a tread element on a first side of a tire.
Figure 14:
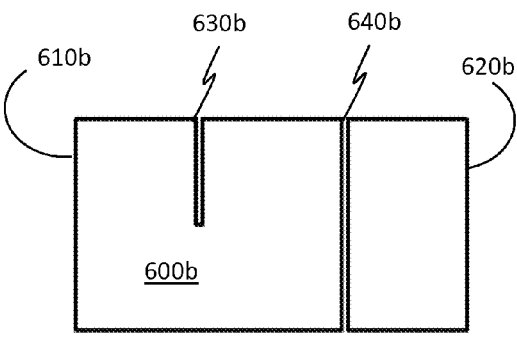
FIG. 14 is a side view of still another alternative embodiment of a tread element on a second side of a tire.

FIGS. 13 and 14 illustrate cross sections of yet another alternative embodiment of first and second tread elements 600a,b on a first and second side of a tire, respectively. In this embodiment, first tread element 600a includes a first leading lug wall 610a and a first trailing lug wall 620a. A first leading sipe 630a is proximate to the first leading lug wall 610a and a first trailing sipe 640a is proximate to the first trailing lug wall 220a. The first leading sipe 630a has a depth greater than that of the first trailing sipe 640a. In one embodiment, the depth of the first leading sipe 630a is twice as great as the depth of the first trailing sipe 640a. However, any range of depths may be employed.

Additionally, in this embodiment second tread element 600b includes a second leading lug wall 610b and a second trailing lug wall 620b. A second leading sipe 630b is proximate to the second leading lug wall 610b and a second trailing sipe 640b is proximate to the second trailing lug wall 620b. The first trailing sipe 640b has a depth greater than that of the second leading sipe 630b. In one embodiment, the depth of the second trailing sipe 640b is twice as great as the depth of the second leading sipe 630b. However, any range of depths may be employed.

The example configurations shown in FIGS. 1-14 should not be taken to be limiting. It should be understood that the above described concept may be applied to any first set of tread elements on a first side of a tire, and any second set of tread elements on a second side of a tire. While example tread elements were shown having two, three, or four sipes, it should be understood that any number of sipes may be employed.

Figure 15:
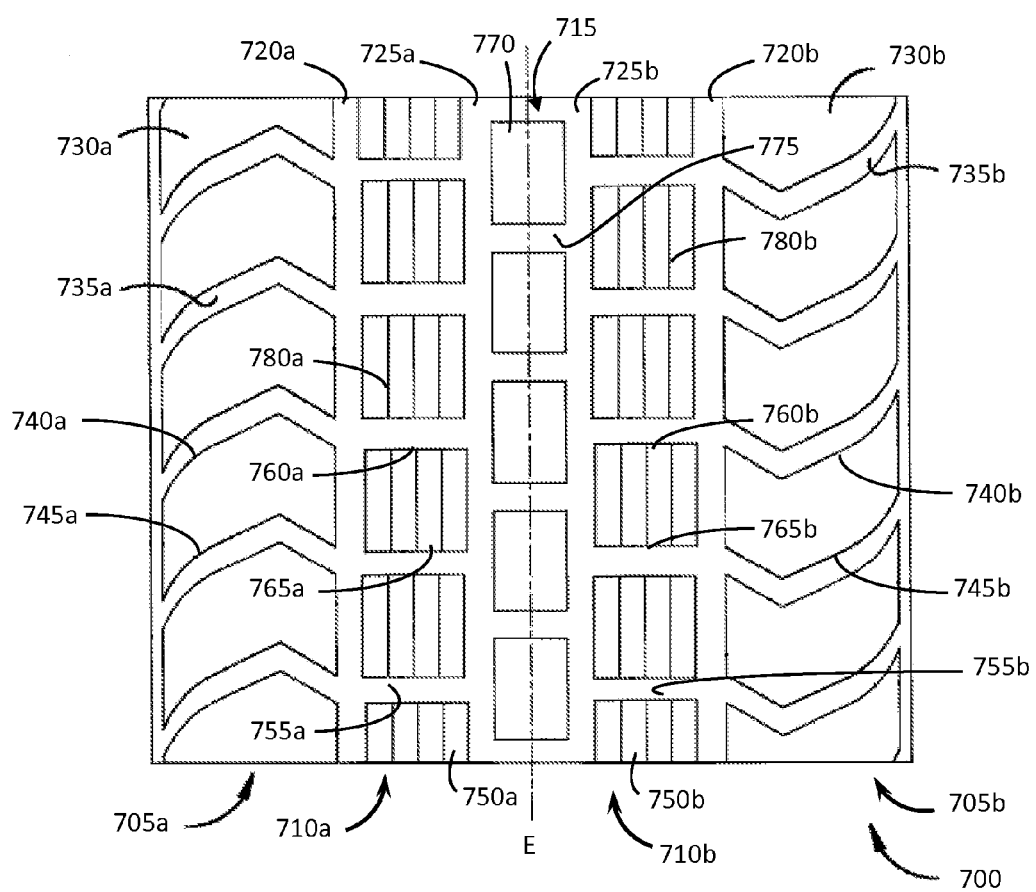
FIG. 15 is a diagrammatic plan view of an alternative embodiment of a tire tread.

FIG. 15 illustrates is a diagrammatic plan view of an alternative embodiment of a tread patter 700 for a tire having an equatorial plane E. The tread pattern 700 is substantially the same as the tread pattern 100 of FIG. 1, except for the differences described below. It should be understood that the tread pattern 700 is subject to the various alternative embodiments described above with respect to the tread pattern 100.

In the illustrated embodiment, the tread pattern includes a pair of shoulder ribs 705a,b, a pair of intermediate ribs 710a,b and a center rib 715. A pair of outer circumferential grooves 720a,b separate the shoulder ribs 705a,b from the intermediate ribs 710a,b. Additionally, a pair of inner circumferential grooves 725a,b separate the intermediate ribs 710a,b from the center rib 715.

The first shoulder rib 705a is formed by a first plurality of shoulder tread blocks 730a separated by first shoulder lateral grooves 735a. Each of the first plurality of shoulder tread blocks 730a has a first shoulder leading lug wall 740a and a first shoulder trailing lug wall 745a. Likewise, the second shoulder rib 705b is formed by a second plurality of shoulder tread blocks 730b separated by second shoulder lateral grooves 735b. Each of the second plurality of shoulder tread blocks 730b has a second shoulder leading lug wall 740b and a second shoulder trailing lug wall 745b.

The first intermediate rib 710a is formed by a first plurality of intermediate tread blocks 750a separated by first intermediate lateral grooves 755a. Each of the first plurality of intermediate tread blocks 750a has a first intermediate leading lug wall 760a and a first intermediate trailing lug wall 765a. Likewise, the second intermediate rib 710b is formed by a second plurality of intermediate tread blocks 750b separated by second intermediate lateral grooves 755b. Each of the second plurality of intermediate tread blocks 750b has a second intermediate leading lug wall 760b and a second intermediate trailing lug wall 765b. Center rib 715 is formed by a plurality of circumferentially spaced central tread blocks 770 separated by central lateral grooves 775.

In the illustrated embodiment, each of the first plurality of intermediate tread blocks 750a includes a first plurality of sipes 780a, and each of the second plurality of intermediate tread blocks includes a second plurality of sipes 780b. Each of the first and second plurality of sipes 780a,b is a straight sipe when viewed from above, and extends across the entire tread block in a circumferential direction. In alternative embodiments, the sipes may be curved, angled, or formed of multiple angled segments. While the illustrated embodiment shows the sipes extending across the entire length of each intermediate tread block, it should be understood that the sipes may only partially extend across the blocks.

Figure 16:
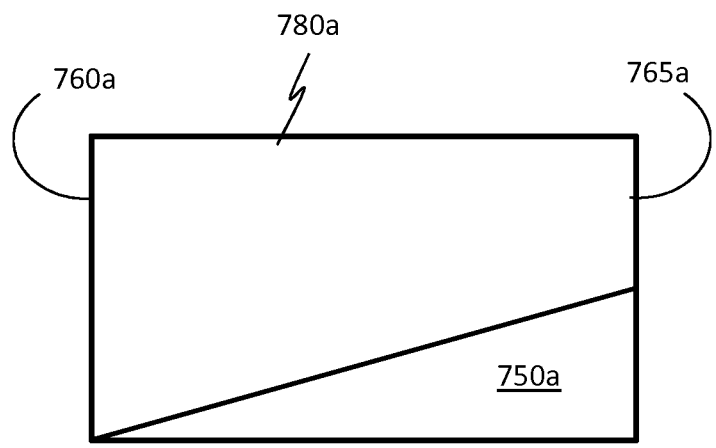
FIG. 16 is a side view of yet another alternative embodiment of a tread element on a first side of a tire.

FIG. 16 is a cross section of one of the first intermediate tread blocks 750a. As can be seen from this view, the depth of the sipe 780a is variable, with the sipe 780a have a greater depth at the first leading lug wall 760a and a lesser depth at the first trailing lug wall 765a. While the depth of the sipe 780a is shown as varying in a linear fashion, it should be understood that the variance need not be linear. For example, the base of the sipe 780a may be curved, wavy, stepped, or follow any desired path. While only a single sipe 780a is visible from this view, it should be understood that one or more of the first plurality of sipes 780a may have a variable depth. Each of the first plurality of sipes may have the same profile, or one or more of the first plurality of sipes may have a different profile.

Figure 17:
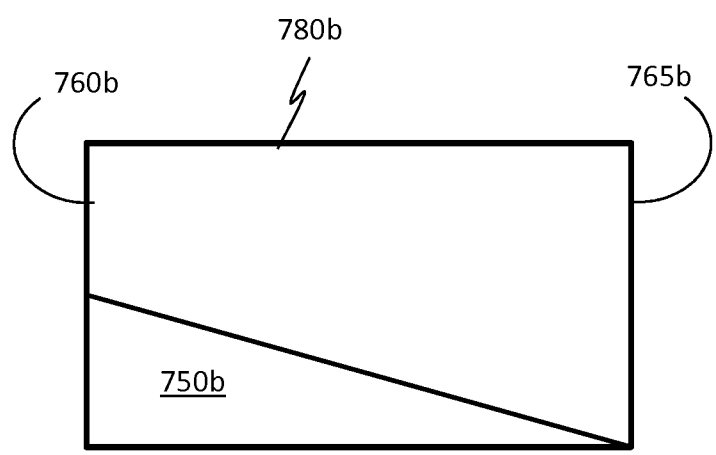
FIG. 17 is a side view of yet another alternative embodiment of a tread element on a second side of a tire.

FIG. 17 is a cross section of one of the second intermediate tread blocks 750b. As can be seen from this view, the depth of the sipe 780b is variable, with the sipe 780b have a greater depth at the first trailing lug wall 765b and a lesser depth at the first leading lug wall 760b. While the depth of the sipe 780b is shown as varying in a linear fashion, it should be understood that the variance need not be linear. For example, the base of the sipe 780b may be curved, wavy, stepped, or follow any desired path. While only a single sipe 780b is visible from this view, it should be understood that one or more of the first plurality of sipes 780b may have a variable depth. Each of the first plurality of sipes may have the same profile, or one or more of the first plurality of sipes may have a different profile.

The depth of the sipes in this embodiment may be varied to achieve a desired RAT in a manner similar to the method described above.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method of manufacturing a tire comprising:
providing a circumferentially extending tread pattern of a tire with at least a first rib on a first side of an equatorial plane and a second rib on a second side of the equatorial plane,
wherein the first rib and the second rib are located equidistant from the equatorial plane,
wherein the first rib includes a first plurality of tread blocks, each of the first plurality of tread blocks having a first leading lug wall, a first trailing lug wall, and a first plurality of sipes including a first leading sipe proximate to the first leading lug wall and a first trailing sipe proximate to the first trailing lug wall, wherein each of the first plurality of sipes extends at 0° with respect to a radial direction of the tire,
wherein the second rib includes a second plurality of tread blocks, each of the second plurality of tread blocks having a second leading lug wall, a second trailing lug wall, and a second plurality of sipes including a second leading sipe proximate to the second leading lug wall and a second trailing sipe proximate to the second trailing lug wall, wherein each of the second plurality of sipes extends at 0° with respect to the radial direction of the tire;
varying a depth of each of the first plurality of sipes and each of the second plurality of sipes to change a residual aligning torque of the tire until a desired residual aligning torque is achieved,
wherein each of the first leading sipes has a depth greater than a depth of each of the first trailing sipes, and
wherein each of the second leading sipes has a depth less than a depth of each of the second trailing sipes; and
forming a tire having the circumferentially extending tread pattern.

2. The method of claim 1, wherein each of the first leading sipes has a depth substantially equal to a depth of each of the second trailing sipes.

3. The method of claim 1, wherein each of the first trailing sipes has a depth substantially equal to a depth of each of the second leading sipes.

4. The method of claim 1, wherein each of the first leading sipes is twice as deep as each of the first trailing sipes.

5. The method of claim 1, wherein the first plurality of sipes further includes at least one first intermediate sipe and wherein the second plurality of sipes further includes at least one second intermediate sipe.

6. The method of claim 5, wherein a depth of the at least one first intermediate sipe is less than the depth of the first leading sipe and greater than the depth of the first trailing sipe, and wherein a depth of the at least one second intermediate sipe is greater than the depth of the second leading sipe and less than the depth of the second trailing sipe.

7. The method of claim 1, wherein all of the first leading sipes have substantially the same first depth, wherein all of the first trailing sipes have substantially the same second depth, wherein all of the second leading sipes have substantially the same third depth, wherein all of the second trailing sipes have substantially the same fourth depth, and wherein the first depth is substantially equal to the fourth depth and the second depth is substantially equal to the third depth.

8. A tire having an equatorial plane defining a first side and a second side, the tire comprising:
a first set of tread elements on the first side of the tire, the first set of tread elements including a first tread element having a front half and a rear half,
wherein the first tread element includes a first plurality of lateral sipes extending at 0° with respect to a radial direction of the tire, including a plurality of first front lateral sipes disposed in the front half of the first tread element and a plurality of first rear lateral sipes disposed in the rear half of the first tread element,
wherein the plurality of first front lateral sipes are spaced different distances from a leading lug wall of the first tread element,
wherein the plurality of first rear lateral sipes are spaced different distances from a trailing lug wall of the first tread element, and
wherein each of the plurality of first front lateral sipes has a depth greater than each of the plurality of first rear lateral sipes; and
a second set of tread elements on the second side of the tire, the second set of tread elements including a second tread element having a front half and a rear half,
wherein the first set of tread elements and the second set of tread elements are located equidistant from the equatorial plane,
wherein the second tread element includes a second plurality of lateral sipes extending at 0° with respect to the radial direction of the tire, including a plurality of second front lateral sipes disposed in the front half of the second tread element and a plurality of second rear lateral sipes disposed in the rear half of the second tread element,
wherein the plurality of first front lateral sipes are spaced different distances from a leading lug wall of the second tread element,
wherein the plurality of first rear lateral sipes are spaced different distances from a trailing lug wall of the second tread element, and
wherein each of the plurality of second rear lateral sipes has a depth greater than each of the plurality of second front lateral sipes.

9. The tire of claim 8, wherein each of the plurality of first front lateral sipes have substantially the same first depth, wherein each of the plurality of first rear lateral sipes have substantially the same second depth, wherein each of the plurality of second front lateral sipes have substantially the same third depth, wherein each of the plurality of second rear lateral sipes have substantially the same fourth depth.

10. The tire of claim 9, wherein the first depth is substantially equal to the fourth depth and the second depth is substantially equal to the third depth.

11. The tire of claim 8, wherein the depth of the plurality of first front lateral sipes varies such that a first front lateral sipe proximate to the leading lug wall of the first tread element has a depth greater than a depth of a first front lateral sipe distal from the leading lug wall of the first tread element, wherein the depth of the plurality of first rear lateral sipes varies such that a first rear lateral sipe proximate to the trailing lug wall of the first tread element has a depth less than a depth of a first rear lateral sipe distal from the trailing lug wall of the first tread element, wherein the depth of the plurality of second front lateral sipes varies such that a second front lateral sipe proximate to the leading lug wall of the second tread element has a depth less than a depth of a second front lateral sipe distal from the leading lug wall of the second tread element, and wherein the depth of the plurality of second rear lateral sipes varies such that a second rear lateral sipe proximate to the trailing lug wall of the second tread element has a depth greater than a depth of a second rear lateral sipe distal from the trailing lug wall of the second tread element.

12. The tire of claim 8, wherein the depth of at least one of the plurality of first front lateral sipes is substantially equal to a height of the first tread element and wherein the depth of at least one of the plurality of second rear lateral sipes is substantially equal to a height of the second tread element.

13. The tire of claim 8, wherein the depth of at least one of the plurality of first rear lateral sipes is substantially equal to 50% of a height of the first tread element and wherein the depth of at least one of the plurality of second front lateral sipes is substantially equal to 50% of a height of the second tread element.

14. The tire of claim 8, wherein each of the first plurality of lateral sipes extends laterally across the entire width of the first tread element, and wherein each of the second plurality of lateral sipes extends laterally across the entire width of the second tread element.

15. A tire comprising:
a circumferential tread pattern having a first plurality of tread blocks on a first side of an equatorial plane and a second plurality of tread blocks on a second side of the equatorial plane, wherein the first plurality of tread blocks and the second plurality of tread blocks are located equidistant from the equatorial plane, wherein each of the first plurality of tread blocks has a first leading lug wall, a first trailing lug wall, and a first plurality of sipes including a first leading sipe proximate to the first leading lug wall, a first trailing sipe proximate to the first trailing lug wall, and a first intermediate sipe disposed between the first leading sipe and the first trailing sipe, wherein each of the first plurality of sipes extends at 0° with respect to a radial direction of the tire, wherein each of the second plurality of tread blocks has a second leading lug wall, a second trailing lug wall, and a second plurality of sipes including a second leading sipe proximate to the second leading lug wall, a second trailing sipe proximate to the second trailing lug wall, and a second intermediate sipe disposed between the second leading sipe and the second trailing sipe, wherein each of the second plurality of sipes extends at 0° with respect to the radial direction of the tire, wherein each of the first leading sipes has a depth greater than a depth of each of the first trailing sipes, wherein each of the first intermediate sipes has a depth equal to the depth of the first leading sipes, wherein each of the second leading sipes has a depth less than a depth of each of the second trailing sipes, and wherein each of the second intermediate sipes has a depth equal to the depth of the second trailing sipes.

16. The tire of claim 15, wherein the depth of each sipe corresponds to a desired residual aligning torque.

17. The tire of claim 15, wherein each of the first plurality of sipes is a lateral sipe, and wherein each of the second plurality of sipes is a lateral sipe.

18. The tire of claim 15, wherein each of the first leading sipes has a depth that is substantially equal to a height of the first plurality of tread blocks, and wherein each of the second trailing sipes has a depth that is substantially equal to a height of the second plurality of tread blocks.

* * * * *